United States Patent
Karagöz et al.

(10) Patent No.: US 10,604,444 B2
(45) Date of Patent: Mar. 31, 2020

(54) TEMPERED GLASS ARTICLE WITH SUB-SURFACE LASER ENGRAVING AND PRODUCTION METHOD

(71) Applicants: SCHOTT AG, Mainz (DE); SCHOTT ORIM Sanayi ve Ticaret A.S., Cerkezköy (TR)

(72) Inventors: Hüda Karagöz, Corlu/Tekirdag (TR); Axel Curdt, Schlangenbad (DE)

(73) Assignees: SCHOTT AG, Mainz (DE); SCHOTT ORIM Sanayi ve Ticaret A.S., Cerkezköy (TR)

( * ) Notice: Subject to any disclaimer, the term of this patent is extended or adjusted under 35 U.S.C. 154(b) by 0 days.

(21) Appl. No.: 15/267,497

(22) Filed: Sep. 16, 2016

(65) Prior Publication Data
US 2017/0001906 A1 Jan. 5, 2017

Related U.S. Application Data

(63) Continuation of application No. PCT/EP2015/054109, filed on Feb. 27, 2015.

(30) Foreign Application Priority Data

Mar. 19, 2014 (DE) .................. 10 2014 205 066

(51) Int. Cl.
*C03C 23/00* (2006.01)
*B23K 26/00* (2014.01)
(Continued)

(52) U.S. Cl.
CPC ...... *C03C 23/0025* (2013.01); *B23K 26/0006* (2013.01); *B23K 26/0622* (2015.10);
(Continued)

(58) Field of Classification Search
CPC ........ B41M 5/262; B41M 3/16; B41M 5/007; B41C 1/05; B41C 1/1025; B41C 1/1033; C03B 33/091; C03B 33/093; C03B 33/102
See application file for complete search history.

(56) References Cited

U.S. PATENT DOCUMENTS 5,206,496 A 4/1993 Clement et al.
5,609,284 A * 3/1997 Kondratenko ..... B23K 26/0736 225/1

(Continued)

FOREIGN PATENT DOCUMENTS

DE 4407547 A1 9/1995
DE 19855623 C1 2/2000
(Continued)

OTHER PUBLICATIONS

Article "Sub-surface engraving" from website http://cerion-laser.com/applications-sub-surface-glass-engraving.htm, 2 pages.
(Continued)

*Primary Examiner* — Humera N Sheikh
*Assistant Examiner* — Elizabeth D Ivey
(74) *Attorney, Agent, or Firm* — Ohlandt, Greeley, Ruggiero & Perle, L.L.P.

(57) ABSTRACT

A glass article is provided that has sub-surface laser engraving and a prestressing of the surface. A production method for the glass article and the use of the glass article are also provided. The sub-surface laser engraving is arranged in a partial volume of the glass article that is under tensile stress, with tempering of the glass article being performed after the introduction of the sub-surface laser engraving.

18 Claims, 2 Drawing Sheets

(51) Int. Cl.
*B23K 26/53* (2014.01)
*C03B 27/04* (2006.01)
*B23K 26/082* (2014.01)
*B23K 26/0622* (2014.01)
*G02B 5/02* (2006.01)
*B23K 103/00* (2006.01)
*B41M 5/26* (2006.01)

(52) U.S. Cl.
CPC ............ *B23K 26/082* (2015.10); *B23K 26/53* (2015.10); *C03B 27/0413* (2013.01); *G02B 5/0205* (2013.01); *B23K 2103/54* (2018.08); *B41M 5/262* (2013.01); *Y02P 40/57* (2015.11)

(56) References Cited

U.S. PATENT DOCUMENTS

| | | | |
|---|---|---|---|
| 6,596,966 | B1 | 7/2003 | Kickelhain et al. |
| 9,481,598 | B2* | 11/2016 | Bergh .................... B23K 26/38 |
| 2008/0304525 | A1* | 12/2008 | Kupisiewicz .......... B41M 5/262 |
| | | | 372/30 |
| 2010/0206008 | A1* | 8/2010 | Harvey ............... C03B 33/0222 |
| | | | 65/105 |
| 2012/0047956 | A1* | 3/2012 | Li ........................ C03B 33/091 |
| | | | 65/112 |
| 2013/0129947 | A1* | 5/2013 | Harvey ................. C03B 33/091 |
| | | | 428/34.4 |
| 2013/0291598 | A1* | 11/2013 | Saito ....................... C03B 33/07 |
| | | | 65/112 |
| 2014/0042202 | A1* | 2/2014 | Lee ....................... C03B 33/033 |
| | | | 225/2 |
| 2014/0147624 | A1* | 5/2014 | Streltsov ................. C03C 3/083 |
| | | | 65/30.14 |
| 2014/0290310 | A1* | 10/2014 | Green ................ B23K 26/0087 |
| | | | 65/112 |
| 2015/0075221 | A1* | 3/2015 | Kawaguchi ......... C03B 33/0222 |
| | | | 65/60.1 |
| 2015/0166393 | A1* | 6/2015 | Marjanovic ........... C03B 33/091 |
| | | | 428/131 |
| 2015/0183679 | A1* | 7/2015 | Saito ....................... C03B 33/04 |
| | | | 65/112 |
| 2016/0200621 | A1* | 7/2016 | N'Gom .................. B23K 26/38 |
| | | | 428/192 |

FOREIGN PATENT DOCUMENTS

| | | |
|---|---|---|
| DE | 10015702 A1 | 10/2001 |
| DE | 20117697 U1 | 1/2002 |
| DE | 10162111 A1 | 6/2003 |
| DE | 202006004064 U1 | 7/2006 |
| DE | 102008004995 B3 | 12/2008 |
| EP | 0543899 B2 | 10/2002 |
| JP | 2004002056 | 1/2004 |
| JP | 2004323252 A | 11/2004 |
| WO | WO 2012174545 A1 * | 12/2012 ........... B23K 26/048 |

OTHER PUBLICATIONS

Mognato et al.: "Thermally toughened safety glass: correlation between flexural strength, fragmentation and surface compressive stress", www.glassonweb.com, 9 pages.
English translation of International Preliminary Report on Patentability dated Sep. 20, 2016 for corresponding International Application No. PCT/EP2015/054109, 12 pages.
Search Report of the International Search Authority dated Sep. 24, 2015 in corresponding International Application No. PCT/EP2015/054109.
Written Opinion of the International Search Authority dated Sep. 24, 2015 in corresponding International Application No. PCT/EP2015/054109.

* cited by examiner

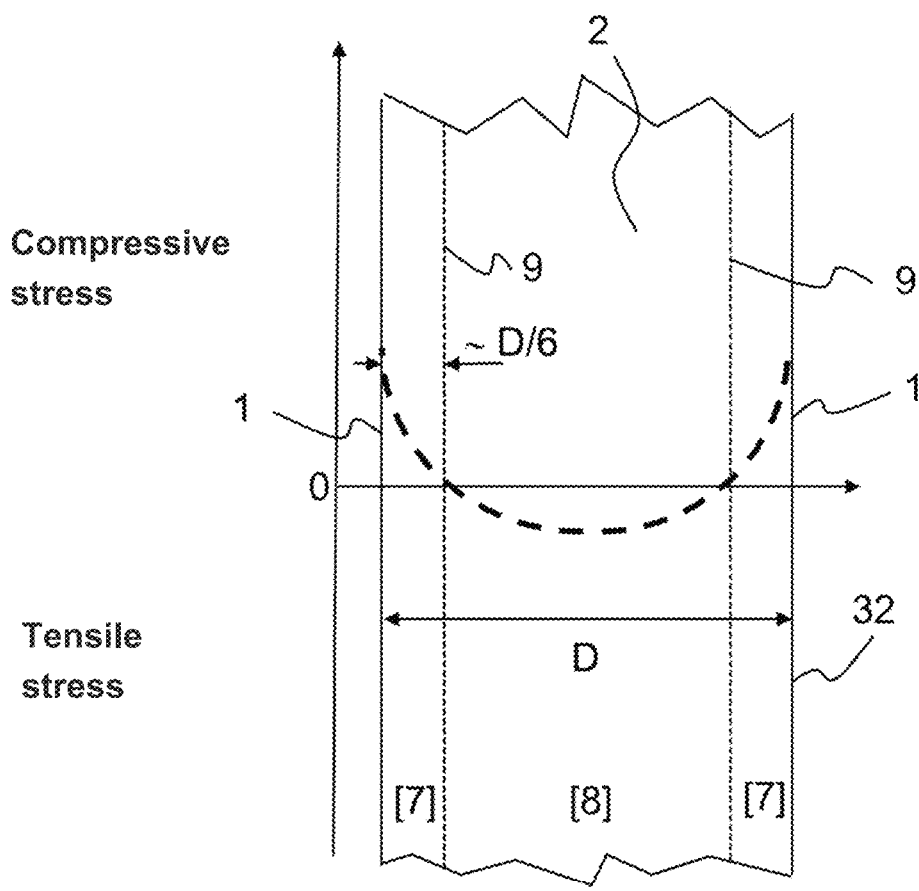

TEMPERED GLASS ARTICLE WITH SUB-SURFACE LASER ENGRAVING AND PRODUCTION METHOD

CROSS REFERENCE TO RELATED APPLICATIONS

This application is a continuation of International Application No. PCT/EP2015/054109 filed Feb. 27, 2015, which claims benefit under 35 U.S.C. § 119(a) of German Patent Application No. 102014205066.9 filed Mar. 19, 2014, the entire contents of both of which are incorporated herein by reference.

BACKGROUND

1. Field of the Invention

The invention relates to a glass article with a sub-surface laser engraving and a prestressing of the surface, to a production method for the glass article and to the use of the glass article.

The invention is based on a body of glass, with a marking arranged under the surface of the body, produced by a laser beam directed onto the surface of the body, which penetrates through the body to a predetermined depth, can be focused within the glass body at the location of the desired marking, and thereby produces a change in the material at the location of the desired marking that has the effect of visibly changing a secondarily introduced radiation, without changing the surface of the glass body.

2. Description of Related Art

Such glasses that are marked by means of laser radiation are known. For example from European Patent EP 0543899 B2, in which a method for providing a body of material with a marking arranged under the surface, which represents a desired designation, is described in Claim 1, the method having the steps of directing onto the surface of the body a beam of a high energy density, which is able to penetrate through the material at least to the depth of the desired marking, focusing the beam at a location that is at a distance from the surface and is arranged within the material, in order in this way to bring about localized ionization of the material and the formation of a marking at the location in the form of an area of increased opacity to electromagnetic radiation, substantially without any determinable change in the surface, and moving the focal point of the beam in relation to the body to be marked, so that the marking can have a predetermined form. Independent Claim 14 of this patent relates to the marked body of material itself, and the body of material is defined in the description as consisting for example of glass or plastic.

German Patent Specification DE 19855623 C1 also discloses a method for producing a marking lying under the surface in a body of glass, which has a transmission curve with a plateau region at wavelengths that are greater than those of x-rays, wherein a laser beam is directed onto a surface of the body, which is able to penetrate through the body to the predetermined depth of the marking and furthermore is focused at the predetermined location of the marking within the glass and has such a power density that a marking in the form of a change in the material that is distinguished by reduced transmissivity to electromagnetic radiation is produced at the location, substantially without any determinable change occurring at the surface of the body, using a wavelength of the laser light at which the glass is partially transmissive and which is lower than all of the wavelengths of the laser light corresponding to the plateau region.

Furthermore, German Utility Model DE 20 2006 004064 U1 discloses a glass-ceramic plate provided with an inscription and/or with ornamentation, the characters and/or the ornamental elements being formed by changes in the structure of the material of the plate in the interior of the plate that are induced by means of a laser beam.

However, there is only little prior art relating to the provision of such glass articles with a compressive prestressing of the surface. However, such tempered glass articles are of great importance in many applications where high mechanical strength is required. Since, in the case of glasses, the tensile strength is much less than the compressive strength on account of surface defects, measures for toughening the surface of glasses always aim to put the surface layers of glasses under compressive stress in order to press together cracks that are present in the surface of the glass, and consequently hinder them from opening, that is to say hinder the introduction of breaking. Only when the loading is greater than the compressive stress produced is there the risk of breakage. A distinction is drawn here substantially between two methods of surface toughening, thermal toughening and chemical toughening.

Thermally tempered glass panes are used for example in household appliances, for aircraft windows, for burglar-resistant glazing and for fireproof glazing. To allow a glass article to be thermally toughened well, it must have a sufficiently great wall thickness of at least approximately 2 mm. If the thickness is too small, an adequate temperature gradient cannot be established during cooling down, and the zone of compressive stress is too thin; the cracks that are present then penetrate still deeper into the zone of tensile stress. In the case of thermal toughening, an increase in the flexural strength by a factor of 5 to 7, and in the tensile strength by a factor of 3 to 4 can be achieved. Furthermore, thermal surface toughening has a further associated advantage, that of a more favourable breakage behaviour. In the tensile-stressed interior of the piece of glass, a considerable amount of energy is stored, causing shockwaves when a crack penetrates, because of the sudden stress relief, and the shockwaves rapidly destroy the piece of glass, producing small fragments without any hazardous splintering effect. For this reason, thermally toughened glasses cannot undergo any further working.

The provision of glass articles with sub-surface engraving and compressive prestressing of the surface is the main subject of DE 10015702 A1 and also of DE 10 2008 004995 A1. DE 10015702 A1 teaches that the introduction of a sub-surface laser engraving can be performed into a flat glass body, by the sub-surface engraving being arranged in a volume directly underneath the surface of the glass article, which is under compressive stress. In paragraph [0012], it is required that all of the sub-surface engraving points of a three-dimensional marking are located within the portion that is under compressive stresses. Furthermore, according to the main claim of DE 10015702 A1, it is also intended to be possible, in a first step, to arrange a laser engraving directly underneath the surface of the glass article and subsequently, in a second step, to carry out a toughening. Similarly, DE 10 2008 004995 A1 teaches in Claim 1 the production of a marking by means of laser radiation in a surface-toughened body of glass exclusively in the internal region of the glass body that is under compressive stress. However, the application of the sub-surface laser engraving within the regions that are under compressive stress has for example the disadvantage that, for example in the case of thermally tempered glass, only a thin surface layer with a layer thickness of approximately ⅙ of the thickness of the pane is under compressive stress, and is consequently available for the sub-surface laser engraving, while a large part of the volume of about ⅔ is under tensile stress. Consequently, a high degree of positioning accuracy during the engraving is required for the reliable positioning of the sub-surface laser engraving in the region that is under compressive stress. The problem of high positioning accuracy also arises indirectly from Claim 7 of DE 10015702 A1. Consequently, in the case of these methods there is also the risk of impairing the surface of the glass body when introducing the sub-surface engraving.

Commercial suppliers of sub-surface laser engravings in glass generally refrain from applying sub-surface laser engravings in thermally tempered glass. Safety glass or thermally toughened glass or glass which is to be processed into safety or thermally toughened glass unfortunately cannot be reliably provided with sub-surface engraving. From experience, the micro-structures created by the laser can lead to a sudden and spontaneous breakage of the glass even months later although the safety or toughened glass looks stable initially.

It must therefore be assumed that the provision of thermally tempered glass articles with sub-surface laser engravings is not possible stably at present, or at least only to a greatly restricted extent, with the loss of mechanical strength.

SUMMARY

The invention is based on the object of providing a tempered glass article that has a sub-surface laser engraving and also of providing a production method for the glass article, while avoiding the disadvantages of the prior art.

The glass article according to the invention has a surface and an internal region, the surface having a compressive stress and the internal region having at least one region of compressive stress and at least one region of tensile stress, and a sub-surface laser engraving being arranged in the internal region of the body. The glass article according to the invention is characterized in that the sub-surface laser engraving is arranged in a region that is under compressive stress.

The inventors have recognized that, contrary to the teaching put forward in the prior art, it is surprisingly quite possible for a sub-surface laser engraving to be arranged in a region that is under tensile stress, as long as the prestressing is performed after the introduction of the sub-surface laser engraving. Thus, for example, after introducing a sub-surface laser engraving approximately in the middle plane of the pane, non-toughened soda-lime glass panes of a pane thickness of 4 mm and 6 mm according to exemplary embodiments 1 and 2 can be thermally highly tempered in the usual way, without any breakage of the pane occurring. The panes produced in such a way have a high mechanical strength and meet the requirements for corresponding thermally tempered glass or safety glass. When the sequence of the process has been reversed, that is to say when it has been attempted to apply a sub-surface laser engraving within already thermally tempered soda-lime glass panes of a pane thickness of 6 mm approximately in the middle plane of the panes, at a distance of approximately 2 cm from the edge, the pane has often broken as soon as the sub-surface laser engraving is introduced, as can be seen from the counter-example 2.

The teaching according to the invention consequently makes it possible to provide a tempered, mechanically stable glass article that has an sub-surface engraving. The underlying recognition represents a departure from the existing prior art and overcomes a prejudice of the prior art.

At present, there is no validated explanation for the cause of the influence of the sequence of the two process steps, sub-surface laser engraving and thermal tempering, and so the teaching and the recognition according to the invention can be considered to be very surprising. Without being bound to this theory, it is presumed that the heating up of the still untempered glass article during the process of tempering has the effect of a partially healing the defects that have been produced by the sub-surface laser engraving, or that there is a reduction in the mechanical stresses around the defects that are induced by the sub-surface laser engraving. As a result, in spite of being arranged in a region that is under tensile stress after the tempering, the defects do not appear to act as crack initiators. The light-diffusing action of the defects is maintained however. Similarly, the cause could be based on the fact that, when the sub-surface laser engraving is introduced into an already tempered glass body, there is an unfavourable overlaying of the existing tensile stress with the temporary stress produced by the laser. Thus, a high temperature and a corresponding stress field are temporarily produced by the laser, and there is possibly even a local vaporizing of the glass, and so, on account of the vapor pressure, temporary stresses are likewise produced in the glass body. These only temporarily present stresses have already subsided when the glass body is tempered after the laser engraving.

The glass article may be generally a body of any desired form of a specific type of glass, for example a glass block, a flat or curved pane. It may also be any type of glass, for example optical or technical glasses. On account of the good availability, it is preferably a commercially available soda-lime glass, which is available as float glass in grades of high quality and a wide variety of dimensions and degrees of purity. Preferred for aesthetic reasons are low-$Fe_2O_3$ grades of glass, which have a lower green tinge, but cost more than the standard green-tinged grade. Similarly, it may be borosilicate glass, for example borosilicate float glass panes of the Borofloat brand from Schott AG.

The sub-surface laser engraving generally consists of at least one defect of a size of at least 10 μm, which has been produced by at least one laser. The defect is arranged completely within the glass article and does not extend up to the surface of the glass article. It is preferably visible to the unaided eye, that is to say without the assistance of optical aids. A sub-surface laser engraving preferably consists of a multiplicity of defects that are arranged in spatial groups. Particularly preferably, the defects are in this case so small, and arranged so closely together, that the individual defects are indistinguishable to the unaided eye, that is to say without optical aids, and a homogeneous impression is produced.

In a preferred embodiment, the glass article is thermally tempered, the surface having a tensile stress of at least 50 MPa, preferably at least 70 MPa and particularly preferably at least 90 MPa. With a prestressing of the surface of 40 MPa to approximately 70 MPa, this is usually referred to as thermally toughened glass, while a classification as safety glass or "fully tempered glass" requires tempering values of over 70 MPa and 100 MPa, respectively.

In a preferred embodiment, the glass article is a pane with a pane thickness D of 2 mm to 12 mm, preferably 3 mm to 9 mm and particularly preferably 4 mm to 6 mm. Such panes of soda-lime glass are obtainable at low cost from flat-glass manufacturers and can be thermally or chemically tempered. Panes with a pane thickness of 3 mm to 9 mm, which can be thermally tempered very well, are used for most applications. The pane may be flat or curved. Thus, for example, it may be a curved windowpane of a motor vehicle or other vehicle, preferably a side window or a rear window of a motor vehicle. The pane may be rectangular or of any other desired form; the peripheral edge may likewise be of any desired form, and have for example a rounded finish.

In a preferred embodiment, the sub-surface laser engraving has a minimum distance from the surface of the pane of D/4 and preferably D/3. Furthermore, a two-dimensional engraving with a surface extent may preferably be arranged approximately in the region of the middle plane of the glass pane. The prior art DE 10015702 A1 teaches the introduction of a laser engraving directly underneath the surface of a sheetlike glass body, where there is a compressive stress, typically according to Claim 2 within a maximum distance of D/4 from the surface of the pane. Furthermore, it is intended also to be possible in a first step to introduce a laser engraving directly underneath the surface of the glass body and subsequently to carry out toughening. A sequence of the process steps, laser engraving and thermal tempering, is not specified there, though in the exemplary embodiments the thermal tempering is always performed before the introduction of the sub-surface laser engraving.

However, the inventors have recognized that it is surprisingly not possible to arrange a sub-surface laser engraving directly underneath the surface of the glass article, where there is a compressive stress, and subsequently carry out a thermal tempering. Correspondingly laser-engraved specimens with an engraving near the surface have broken when it has been attempted to thermally temper the panes, as counter-example 1 of the present description reveals.

It is presumed that this breaking of the panes is directly attributable to tensile stresses directly underneath the surface of the glass article, which occur during the quenching process in the thermal tempering, that is to say the blasting with cooling air. Thus, when blasting a glass pane with air, first the surface is intensely cooled, and as a result a high tensile stress is temporarily produced in the surface of the glass article at the beginning of the cooling-down process, while the layer near the surface of the glass article is under compressive stress after the tempering process, that is to say at room temperature.

According to the present invention, the sub-surface laser engraving is specifically not arranged directly underneath the surface of the glass article but instead, as a departure from the prior art, the sub-surface laser engraving is at a minimum distance from the surface of the pane of D/4 and preferably D/3. Particularly preferably, the sub-surface laser engraving is even arranged in the region of the middle plane, where there is the greatest tensile stress in a thermally tempered pane.

The teaching of the present invention is therefore precisely contrary to the prior art, under the boundary condition that the thermal tempering is only performed after the introduction of the laser engraving. The influence of the sequence of the process steps, laser engraving and tempering, is not recognized in the prior art.

In a preferred embodiment, the sub-surface laser engraving consists of a multiplicity of defects of an average size G of 10 μm to 1000 μm, preferably 20 μm to 100 μm, the defects preferably forming altogether one or more numerals, letters or symbols or a combination thereof. The sub-surface laser engraving may generally be performed in a way corresponding to the prior art, as it is known for example from DE 10015702 A1 or DE 10 2008 004995 A1. In order to produce an easily visible sub-surface laser engraving, generally multiple defects are produced. When viewed microscopically, the defects prove to be microcracks, which are arranged around the point at which the laser is focused. The size of an individual defect depends here on the laser parameters, such as the wavelength, focus diameter and pulse energy.

The defects of the average size G are preferably arranged in a two-dimensional grid with a spacing R, and with the ratio R/G being between 1 and 10, preferably between 2 and 5. This ensures that there is a largely undamaged glass matrix between the defects. The laser engraving may be formed for example with an area extent, preferably two-dimensionally. Thus it may be for example a script or a symbol, which is arranged in a plane parallel to an outer surface of the glass article, preferably in the middle plane of a glass pane. To increase the visibility of the sub-surface laser engraving, the sub-surface laser engraving may also be arranged on multiple parallel levels, the spacing of which is greater than the average size G. Such sub-surface laser engravings can be identified particularly clearly when the pane is viewed from above. Similarly, the laser engraving may be formed three-dimensionally, as is very well known from the prior art, or may reproduce the outer surface of a three-dimensional body.

A method for producing a glass article with a sub-surface laser engraving, which has already been described in its main process steps, is also the subject of the present invention.

The method according to the invention comprises the following process steps in the sequence given: providing a glass blank, with a surface and an internal region, introducing a sub-surface laser engraving in a partial volume of the internal region tempering the glass blank, at least the partial volume of the internal region with the sub-surface laser engraving being put under tensile stress.

The imperative adherence to the sequence of the process steps and the arrangement of the sub-surface laser engraving in a partial volume of the internal region of the glass blank that is put under tensile stress after the tempering of the glass blank have already been described.

The surface of the glass blank that is provided preferably has a compressive stress of at most 50 MPa, preferably at most 25 MPa and particularly preferably at most 10 MPa. As stated above, the introduction of sub-surface laser engravings in the already thermally tempered glass blanks is not readily possible. The glass blank should have the least possible tensile stress. Commercially available, not thermally toughened or tempered glass panes meet these preconditions and can be used as a glass blank.

The laser engraving can be carried out by the methods that are sufficiently well known from the prior art, and so there is no need here for an in-depth description. By way of example, a diode-pumped, water-cooled Nd:YAG laser of the type Vitrolux V1 from the company Vitro Laser GmbH, D-32423 Minden, may be used at wavelengths of 532 nm (optionally 1064 nm), a pulse repetition rate of 1 kHz and a pulse duration of less than 10 ns. A high-power flat-field optics with a scanning field of 70×70 $mm^2$ and a focal length of 100 mm may be used as the optics.

The thermal tempering of the glass blank may likewise be carried out according to the methods that are known from the prior art. This involves the glass article that is to be toughened being heated to a temperature just above the transformation point of the glass and then quenched, for example by blasting with cold air or by pressing with cold metal plates. During this process, the glass of the surface layer "freezes" faster than the glass in the interior, while the not yet frozen glass interior cools down further and contracts. In this way, the formation of compressive stresses occurs in the surface of the glass, whereas the interior of the glass is under tensile stresses and compensates for the compressive stresses.

In a preferred embodiment, the glass blank is a pane with a pane thickness D of 2 mm to 12 mm, preferably 3 mm to 9 mm and particularly preferably 4 mm to 6 mm.

In a preferred embodiment, the glass blank is thermally tempered, the surface having after the thermal tempering a compressive stress of at least 50 MPa, preferably at least 70 MPa and particularly preferably at least 90 MPa. As a person skilled in the art knows, the prestressing can be set by the cooling rate. The level of prestressing should generally be set according to the minimum requirements of the respective application.

In a preferred embodiment, the introduction of the laser engraving is performed by a laser beam directed onto the surface of the body, which penetrates through the glass blank to a predetermined depth, is focused within the glass blank and thereby produces a visible change in the material, without changing the surface.

Uses of the glass article according to the invention are also the subject of the invention. The glass article according to the invention can be used for numerous applications. Thus, all applications in which tempered glass panes are currently used come into consideration in particular, the sub-surface laser engraving being able to provide additional functionalities.

Use of a glass article according to the invention as a shelf for furniture or refrigeration units, as a component part of a domestic appliance, such as, for example, an oven door window, a freezer cover, an extractor hood or a stove cover, as a viewing window, as vehicle glazing, as a component part of a pane of laminated safety glass or as a shower enclosure element is preferred. In comparison with surface engravings, the sub-surface laser engraving allows damage to the surface to be avoided, which for example facilitates the cleaning of the glass article.

Use of a glass article according to the invention as a lighting element in a subassembly which comprises at least the glass article and a light source, the light from the light source being directed onto the sub-surface laser engraving in the glass article and diffused, is also preferred. In this application in particular, the glass article may consist of especially "white" glass, such as low Fe2O3 soda-lime glass or Borofloat® from the company Schott AG, in order to avoid a green tinging of the light diffused at the sub-surface laser engraving. It may for example be a shelf for furniture or refrigeration units, decorative effects being produced by the sub-surface laser engraving, or else a script such as for example a trade name being illuminated.

Furthermore, a sub-surface laser engraving in a tempered glass article cannot be removed without destroying the glass article, and represents a permanent identification of a tempered glass article that cannot be manipulated.

The invention is now explained on the basis of some exemplary embodiments:

EXEMPLARY EMBODIMENT 1

A commercially available, non-tempered float glass pane of soda-lime glass with a pane thickness of 6.0 mm, a length of 500 mm and a width of 250 mm and also a U-shaped edge finish served as the glass blank. The panes had a compressive stress of the surface of less than 20 MPa, that is to say were almost stress-free.

The sub-surface laser engraving was performed with a green, frequency-doubled Nd:YAG laser at a wavelength of 532 nm, as is known for non-tempered glass from the prior art.

A script with a character height of about 10 mm and a length of 100 mm was introduced at a distance of 5 mm from the front side edge of the glass pane, the script comprising a first level at a depth of 3 mm, that is to say lying in the middle plane of the pane, and comprising a second level at a depth of 3.5 mm, similar to FIGS. 2a and 2b. The laser engraving is formed by microcracks arranged on a grid, the grid spacing in the longitudinal and transverse directions of the pane being 0.09 mm. The double form of the script on two parallel levels means that the script is very easily legible under normal lighting conditions, i.e. in particular without light being especially coupled into the glass pane. If light is coupled into the glass pane, preferably into the peripheral outer edge, the light is greatly diffused at the sub-surface laser engraving and the script is very easily legible.

The panes were subsequently tempered by a conventional thermal tempering process, by heating to 680 to 720° C. and intense blasting with cooling air. The thermal tempering was set such that the panes had a fragmentation of approximately 100, which with a pane thickness of 6 mm corresponds, according to relevant literature (Ennio Mognato et al.: "Thermally toughened safety glass: correlation between flexural strength, fragmentation and surface compressive stress"), to a compressive stress of the surface of approximately 95 MPa to 100 MPa. The fragmentation was determined by breaking a pane lying on an underlying surface in a controlled manner by hitting it with a hammer at a distance of approximately 15 mm from the edge of the pane and subsequently counting the number of fragments in a square of 5 cm×5 cm at a distance of at least 100 mm away from the place hit with the hammer. The fragmentation corresponds to the number of fragments.

For testing the mechanical strength, the following tests were also carried out: (1) Thermal shock test: heating up the pane to 185+/−5° C. in an oven, removal from the oven and cooling down of the pane with a water jet at a temperature of 20° C. and intensity of 10-15 ml/s, which hits the middle of the horizontal glass pane; (2) Ball drop test: a steel ball with a mass of 540 g and a diameter of about 50 mm falls from a height of 410 mm onto the middle of the glass pane, corresponding to an energy of 2.1 Nm; and (3) Weight drop test: a cylindrical steel weight with a mass of 1800 g and a flat end face falls from 150 mm+/−10 mm onto the middle of a pane that is resting on a steel frame only in the edge region.

The procedure was repeated identically for 100 panes of float glass. There was no breakage of any of the panes in the course of the described tests 1. to 3.

EXEMPLARY EMBODIMENT 2

In exemplary embodiment 2, a smaller pane thickness of 4.0 mm was used. Once again, commercially available non-tempered float glass panes of soda-lime glass with a pane thickness of 4.0 mm served as the glass blank. The panes had a compressive stress of the surface of less than 20 MPa, that is to say were almost stress-free.

The engraving was performed as in exemplary embodiment 1 on two levels, but at a depth of 2.0 mm and 2.5 mm.

Thermal tempering was performed as in exemplary embodiment 1, the panes having after the tempering a degree of fragmentation of about 100, which with a pane thickness of 4 mm corresponds to a compressive stress of the surface of approximately 100 to 105 MPa.

COUNTER-EXAMPLE 1

The counter-example corresponds to exemplary embodiment 1, but with the sub-surface laser engraving being arranged at a depth of approximately 0.5 mm. According to the generally known estimating formula, a person skilled in the art expects that, after the thermal tempering, approximately a surface layer of a thickness of ⅙ of the pane thickness will be under compressive stress, and that the glass pane after the thermal tempering will have the least compressive or tensile stresses at a depth of approximately 1 mm. The sub-surface laser engraving was consequently arranged according to the teaching of the prior art DE 10015702 A1 and DE 102008004995 A1.

It was subsequently attempted to thermally temper the planes as in exemplary embodiment 1 to a compressive stress of the surface of approximately 95 MPa to 100 MPa. However, surprisingly most of the planes broke during the thermal tempering. The procedure was repeated identically for 100 panes of float glass, with 100 of them breaking.

The variant that is also claimed in the main claim of DE 10015702 A1, that the thermal tempering is performed after the introduction of the sub-surface laser engraving, therefore cannot be carried out, at least under the boundary conditions described. It appears that the teaching of DE 10015702 A1 can only be carried out in the reverse sequence of the process steps, thermal tempering and sub-surface laser engraving.

COUNTER-EXAMPLE 2

It was also attempted to produce a sub-surface laser engraving in the middle plane of an already tempered soda-lime pane of the pane thickness 6 mm according to exemplary embodiment 1, which corresponds to exemplary embodiment 1 with a reversal of the process steps, sub-surface laser engraving and thermal tempering. The panes had a prestressing of the surface of 100 MPa. The glass panes broke, or exploded, during the introduction of the sub-surface laser engraving.

BRIEF DESCRIPTION OF THE DRAWINGS

The invention is schematically represented in the following figures:

FIG. 1 is a schematic representation of the stress distribution of a thermally tempered glass pane;

DETAILED DESCRIPTION

Figure 2A:
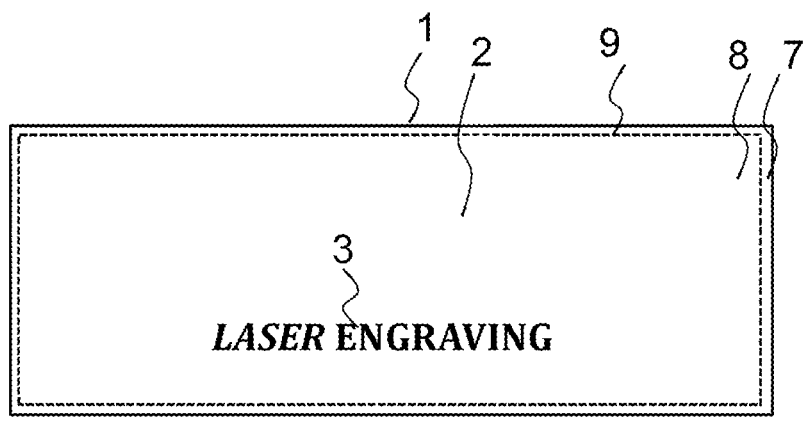
FIG. 2a is a schematic plan view of a glass pane according to the invention with sub-surface laser engraving.

FIG. 1 schematically shows the stress distribution in a thermally tempered glass pane (4). There is a maximum compressive stress at the surfaces (1) of the pane. The compressive stress extends from the surfaces (1) approximately to a depth of D/6, where D is the layer thickness of the pane (4). The pane (4) consequently has regions of compressive stress (7) and tensile stress (8), which merge with one another in a low-stress transitional zone (9). A large part of the volume of the pane (4) is under tensile stress.

Figure 2B:
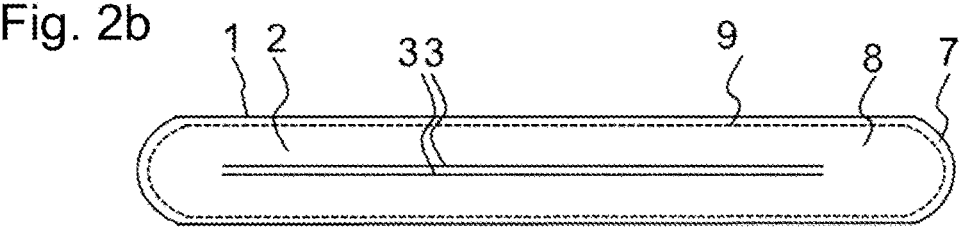
FIG. 2b is a schematic cross section through a glass pane according to the invention with sub-surface laser engraving.

FIG. 2a shows a thermally tempered pane (4) with a sub-surface laser engraving (3) in plan view, FIG. 2b shows the corresponding pane (4) in cross section. The sub-surface laser engraving (3) is formed in a region of tensile stress (8). In FIG. 2b, the sub-surface laser engraving (3) is also arranged approximately in the middle plane of the pane, the engraving being arranged on two parallel levels a small distance apart to increase the contrast. The pane has a thickness of 4 mm.

Finally, the advantages of a sub-surface laser engraving of tempered glass bodies are summarized once again.

The sub-surface laser engraving makes a variable inscription possible, such as for example data matrix codes, logos, barcodes, serial numbers, dates, times of day, names. It is a contactless method of identification, which by contrast with surface engraving does not produce any undesired removal of material, and does not produce any change in the surface of the material. Consequently, there cannot be any problems caused by contamination in subsequent coating processes.

According to the invention, sub-surface laser engravings may also be provided for tempered glass articles. In comparison with the prior art, a much greater partial volume is available for the sub-surface engraving, and so the devices for introducing the laser engraving have to meet less demanding requirements. An impairment of the surface of the glass article can be reliably avoided.

LIST OF REFERENCE NUMBERS

1 Surface
2 Internal region
3 Sub-surface laser engraving
4 Pane
5 Region of compressive stress
6 Region of tensile stress
7 Low-stress transitional zone

What is claimed is:
1. A glass article comprising:
a surface having a compressive stress induced by a thermal tempering process;
an internal region having at least one region of compressive stress and at least one region of tensile stress that are induced by the thermal tempering process; and
a sub-surface laser engraving arranged in the at least one region of tensile stress of the internal region, wherein the sub-surface laser engraving is arranged in the least one region of tensile stress before the thermal tempering process and is at least partially healed and placed in tensile stress by the thermal tempering process, and
wherein the sub-surface laser engraving comprises a plurality of microcracks each having an average size of 20 μm to 1000 μm.
2. The glass article according to claim 1, wherein the surface has a compressive stress of at least 50 MPa.
3. The glass article according to claim 1, wherein the surface has a compressive stress of at least 90 MPa.
4. The glass article according to claim 1, wherein the glass article is a pane with a pane thickness of 2 mm to 12 mm.
5. The glass article according to claim 4, wherein the pane thickness is 4 mm to 6 mm.
6. The glass article according to claim 4, wherein the sub-surface laser engraving is at a minimum distance of the pane thickness divided by 4 from the surface.

7. The glass article according to claim 4, wherein the sub-surface laser engraving is at a minimum distance of the pane thickness divided by 3 from the surface.

8. The glass article according to claim 1, wherein the plurality of microcracks together form a feature selected from the group consisting of a numeral, a letter, a symbol, and combinations thereof.

9. The glass article according to claim 1, wherein the plurality of microcracks are arranged in a two-dimensional grid with a grid spacing, a ratio of the grid spacing to the average size being between 1 and 10.

10. The glass article according to claim 9, wherein the ratio is between 2 and 5.

11. The glass article according to claim 1, wherein the glass article is an article selected from the group consisting of a furniture shelf, a refrigeration unit shelf, a domestic appliance part, a vehicle glazing, a pane of laminated safety glass, a pane of a shower enclosure element, and a lighting element.

12. The glass article according to claim 1, wherein the sub-surface laser engraving is sufficient to diffuse light directed thereon.

13. A glass article comprising:
   a surface having a compressive stress induced by a thermal tempering process;
   an internal region having at least one region of compressive stress and at least one region of tensile stress that are induced by the thermal tempering process; and
   a sub-surface laser engraving arranged in the at least one region of tensile stress, wherein the sub-surface laser engraving is arranged in the internal region before the thermal tempering process introduces the at least one region of compressive stress and the at least one region of tensile stress,
   wherein the sub-surface laser engraving comprises a plurality of microcracks.

14. The glass article according to claim 13, wherein the surface has a compressive stress of at least 90 MPa.

15. The glass article according to claim 13, wherein the plurality of microcracks each have an average size of 20 µm to 1000 µm.

16. The glass article according to claim 13, wherein the plurality of microcracks together form a feature selected from the group consisting of a numeral, a letter, a symbol, and combinations thereof.

17. The glass article according to claim 13, wherein the sub-surface laser engraving diffuses light directed thereon.

18. The glass article according to claim 13, wherein the plurality of microcracks are arranged on multiple parallel levels.

* * * * *